US006789083B2

(12) United States Patent
Thelen (10) Patent No.: US 6,789,083 B2
(45) Date of Patent: Sep. 7, 2004

(54) METHODS AND SYSTEM FOR BROWSING LARGE TEXT FILES (75) Inventor: Gregory W. Thelen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 408 days.

(21) Appl. No.: 09/954,093

(22) Filed: Sep. 17, 2001

(65) Prior Publication Data
US 2002/0010703 A1 Jan. 24, 2002

Related U.S. Application Data (60) Continuation-in-part of application No. 09/567,861, filed on May 9, 2000, now Pat. No. 6,292,802, which is a division of application No. 08/995,676, filed on Dec. 22, 1997, now Pat. No. 6,055,538.

(51) Int. Cl.[7] .............................................. G06F 17/30
(52) U.S. Cl. ...................... 707/101; 707/102; 707/103; 707/104
(58) Field of Search ................................ 707/101, 102, 707/104, 100, 103; 709/213; 345/467

(56) References Cited

U.S. PATENT DOCUMENTS 5,999,944 A  * 12/1999  Lipkin ..................... 707/104.1
6,629,132 B1 *  9/2003  Ganguly et al. ............ 709/213
6,657,625 B1 * 12/2003  Chik et al. .................. 345/467

FOREIGN PATENT DOCUMENTS

EP        0813158 A2  * 12/1997

* cited by examiner

Primary Examiner—Thuy N. Pardo (57) ABSTRACT

A system and associated methods for rapidly displaying large text files. The system preferably includes a client process in communications with a server process. In a first embodiment, the client process receives text from the server process, parses the received text to index the text according to line numbers and saves the parsed text structures in a local cache memory. Users requests for display of specific lines of the text are thereby performed rapidly in accordance with the indexing and caching of the parsed text regardless of the size of the text file. In a second embodiment, the server process receives desired ("hot") line numbers with the request for text file retrieval. The server process then returns portions ("chunks") of the text file in other than sequential order. Specifically, the server process returns "hot chunks" (e.g., chunks containing hot lines) of the requested text file before returning other chunks of the file. The client process then displays the requested "hot lines" quickly regardless of the size of the text file.

17 Claims, 5 Drawing Sheets

METHODS AND SYSTEM FOR BROWSING LARGE TEXT FILES

RELATED PATENTS

This patent is a Continuation-In-Part of U.S. patent application Ser. No. 09/567,861, filed May 9, 2000 Pat. No. 6,292,802 which is, in turn, a Divisional of Ser. No. 08/995,676 U.S. Pat. No. 6,055,538, issued Apr. 25, 2000 and filed on Dec. 22, 1997, both of which are hereby incorporated by reference.

BACKGROUND OF THE INVENTION

1. Field of the Invention

The present invention relates to systems for browsing documents and in particular to methods and systems for using a web browser to quickly search large collections of documents such as arbitrary text documents.

2. Discussion of Related Art

It is common to use a computer to assist a user in browsing through large collections of documents. For example, patent attorneys and patent examiners frequently review large patent documents or collections of related patent or legal documents. Or, for example, computer programmers frequently browse large files of computer source language programs or collections of related source language programs. Computers are applied to assist in such situations to improve, in particular, the speed of searching for symbols or keywords in the collection of documents. Manually searching large collections of documents can be extremely cumbersome and unproductive.

Text editors or word processors on computer systems are known to allow such browsing by simple sequential paging or scrolling through the documents or by search capabilities to locate particular words or phrases. However, such known techniques typically do not use indexed searching techniques to locate desired search terms in the document(s). Indexed searches are those which use an index to rapidly locate occurrences of a particular symbol or keyword in the text. Rather, simple linear search techniques are most commonly utilized by known text editor or word processing techniques. Such simple linear search techniques are impractical when scaled up to very large collections of documents. Simple, non-indexed search techniques cannot provide adequate performance when used in very large collections of documents.

For example, a team of programmers may need to rapidly search for related terms or phrases in the collection of source code files which implement an operating system. One such operating system, by way of example, comprises over 14,000 directories including 70,000 files totaling over 40,000,000 lines of source code. Simple, non-indexed search techniques are inadequate for such large collections of files.

To aid in browsing applications for computer programmers, source code browser programs are often included in program development environments (e.g., in computer aided software engineering (CASE) toolsets). Source code browser programs are usually tightly coupled to the underlying program development package and therefore are only operable in conjunction with the corresponding tools. However, source code browsers do not in general provide browsing service for arbitrary text documents outside the context of the program development tools. Furthermore, they are often constrained by the underlying databases which control the operation of the program development toolset. The databases which contain design information regarding a software development "project" often cannot handle such large collections of files as noted above. Lastly, different source code browser programs each provide a unique user interface potentially forcing a user to learn a proprietary user interface in order to scan collections of documents.

It is a particular problem to display a large text document and quickly jump to a region of interest as represented, for example, by a line number. Present solutions for text browsing access files in a generally sequential manner from first line through last line. To display a region of interest that is not near the start of the file of text requires that the browser sequence through other lines of text at the start of the file to locate the region of interest to the requesting user. Requiring the text browser to sequence through all lines of text in the file before displaying the user's requested line slows the perceived responsiveness of the system.

It can be seen from the above discussion that a need exists for a text search capability that is efficient at searches of large collections of documents and in particular rapidly displays the user's region of interest in the text files.

SUMMARY OF THE INVENTION

The present invention solves the above and other problems, thereby advancing the state of the useful arts, by providing a system and associated methods for using a text browsing (viewing) client/server system to improve perceived performance of the system. More specifically, the present invention provides a client process that requests text files from a server process and presents the received text files in a manner intended to improve perceived performance by the user. In a first preferred embodiment, the client process receives requested text from the server process in blocks (also referred to herein as "chunks") and parses the received chunks of text to identify line numbers of text received. The received, parsed text is stored in local cache memory associated with the client process and indexed to rapidly locate desired line numbers. In a second preferred embodiment, the server process is directed to return chunks of the text file in other than sequential order. In accordance with this second preferred embodiment, the server process returns chunks of the text file in other than sequential order. In particular, the client process provides the server process with one or more desired line numbers. The chunk or chunks containing the desired line numbers are returned first to the client process followed by other remaining chunks of the text file. As used herein the desired line numbers are referred to as "hot lines" and the chunks containing the hot lines are referred to as "hot chunks." Other lines and chunks of the text file are referred to herein as "normal."

A first aspect of the invention provides for a system for displaying large text files comprising: a display for presenting text to a user; a client process responsive to user requests to display selected portions of a text file on the display; and a cache memory associated with the client process for storing data representative of the text file, wherein the client process is operable to parse the text file to identify line numbers associated with the text file and wherein the client process is further operable to store indices in the cache memory identifying the line numbers and corresponding portions of the text file and wherein the client process is further operable to display the selected portions of the text file in accordance with the line numbers.

In another aspect of the invention, the system further comprises a server process responsive to requests from the client process to retrieve an identified text file and to return chunks of text from the identified text file to the client process. And the client process includes: a graphical user interface thread for interacting with a user of the system and for displaying the selected portions of the text file on the display; a fetcher thread operable substantially in parallel with the parser thread for receiving the chunks of text from the server process and for storing the chunks of text in the cache memory; and a parser thread operable substantially in parallel with the graphical user interface thread for parsing the text file to identify the line numbers. And further, requests from the client process to the server process includes at least one line number of interest to a user of the system, and the server process is operable to return chunks of text that include the at least one line number before other chunks of text that do not include the at least one line number.

Additional advantages of the invention will be set forth in part in the description which follows, and in part will be obvious from the description, or may be learned by practice of the invention. The advantages of the invention may be realized and attained by means of instrumentalities and combinations particularly pointed out in the appended claims and depicted in the figures as follows.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
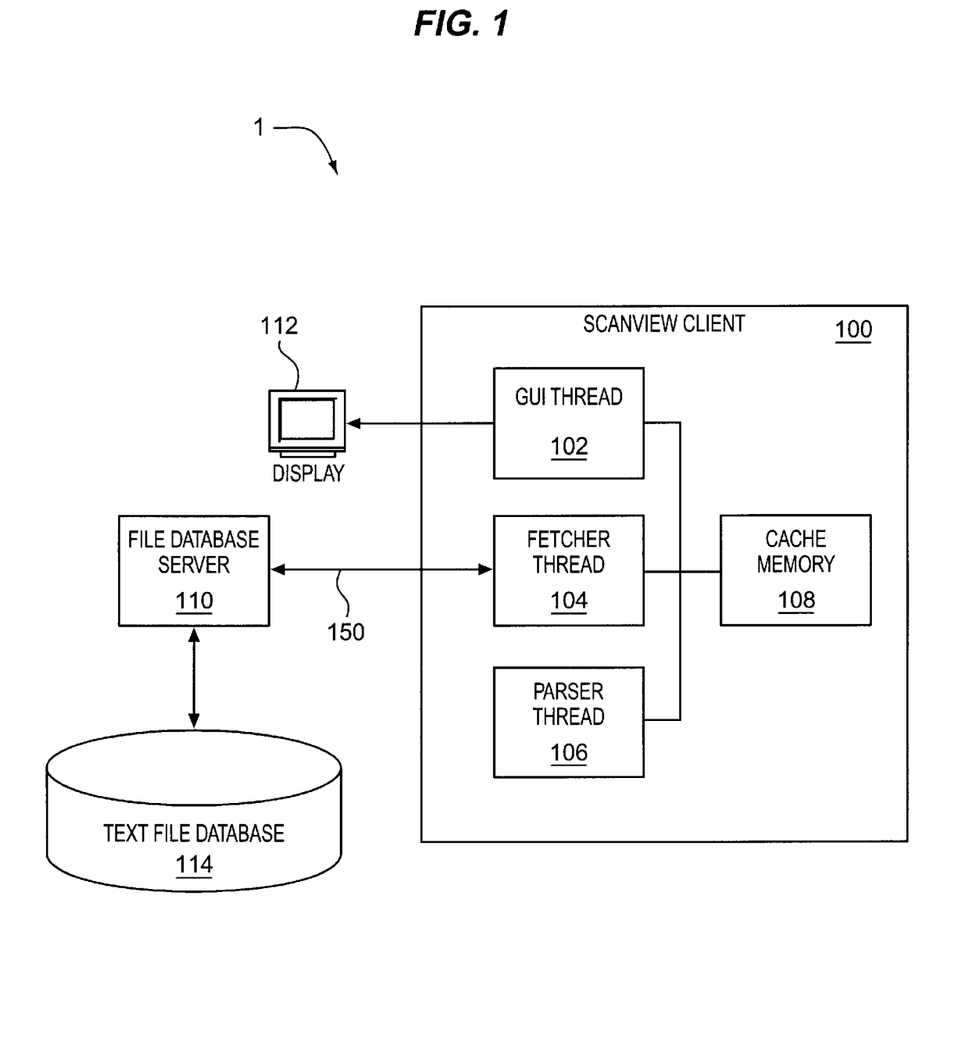
FIG. 1 is a block diagram of a system of the present invention for rapid browsing of large text files.

FIG. 1 is a block diagram of a system 1 of the present invention including a client process 100 operable to display text files on a user display 112. The client process 100 retrieves the text file to be displayed from any storage medium. In a preferred exemplary embodiment, client process 100 retrieves a desired text file using distributed computing techniques coupling the client process 100 to a server process 110 via a distributed computing communication medium 150. For example, client process 100 may be operable on a user's PC or workstation and server process 110 may be operable on a remote file server coupled to the user's PC via network communication medium 150. Those skilled in the art will readily recognize that client/server computing paradigms as depicted in FIG. 1 may be utilized in network distributed computing environments as well as other multiprocessing and multiprogramming environments.

Client process 100 preferably comprises a plurality of threads for performing various aspects of the desired function substantially in parallel. A GUI thread 102 is principally responsible for the overall coordination of retrieval of the requested text file and presentation of the retrieved text file to the user on display 112. Fetcher thread 104 is operable in the depicted client/server computing environment to interact with server process 110 to retrieve chunks of text of the requested text file in parallel with operation of GUI thread 102. Fetcher thread 104 preferably stores retrieved chunks of text of the requested text file in cache memory 108 associated with client process 100. Parser thread 106 is operable in parallel with GUI thread 102 and fetcher thread 104 to parse the retrieved chunks of text stored in cache memory 108 to identify line numbers associated with the text file. Parser thread 106 generates line number index data structures in cache memory 108 to permit rapid access to any portion of the text file in cache memory 108 utilizing line numbers as a standard index. In general, GUI thread 102 utilizes the line number index data structures to rapidly locate a specific line number of the text file requested by the user for presentation on display 112. In accordance with the structure of FIG. 1, the present invention allows for rapid browsing through a large text files in response to a user's request for presentation of a particular line number in the large text file.

Figure 2:
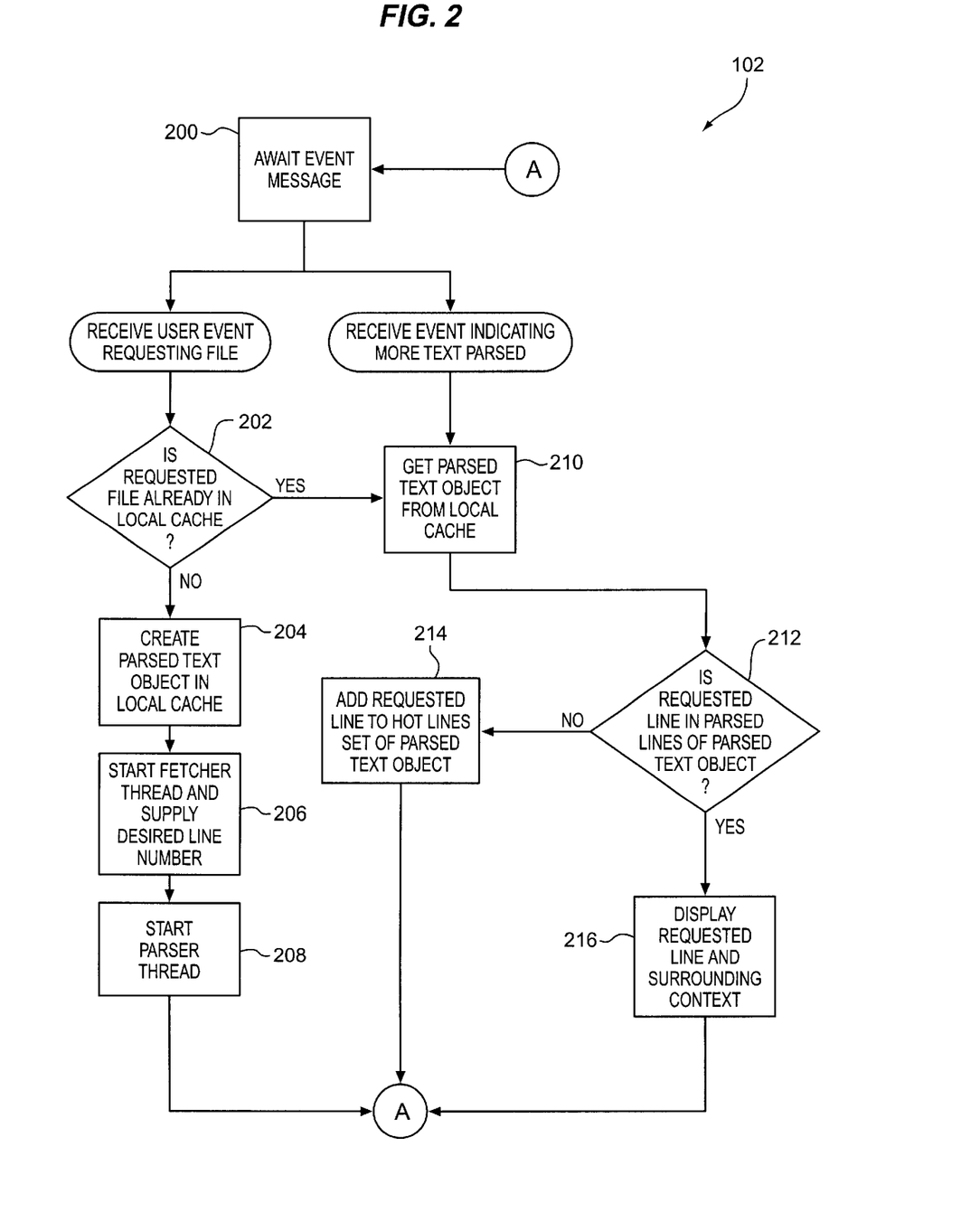
FIG. 2 is a flowchart describing operation of a GUI thread of the client process of the system of FIG. 1.

FIG. 2 is a flowchart describing operation of GUI thread 102. As noted above, GUI thread 102 is responsible for overall control of the retrieval, parsing, and presentation of specified portions of a large text file on the user's display 112. GUI thread 102 is preferably designed as an event driven process as is well known in the art. The event driven GUI thread 102 commences processing with element 200 to await receipt of an event message indicating the need to process a particular event. Upon receipt of an event message indicating a user request for presentation of a specified text file, at a specified line number, element 202 is first operable to determine if the requested file is already resident in the cache memory associated with the client process. If so, processing continues with element 210 as discussed further herein below.

If the requested file is not presently in local cache memory (as indicated for example by presence of a corresponding parsed text object), element 204 is next operable to create a parsed text object in the local cache to serve as a repository for the text file data and associated metadata and indexing structures associated with parsing and presentation of the text file. Those skilled in the art will readily recognize a variety of data structures and program structures to represent such a parsed text object. Element 206 then starts the fetcher thread operable in parallel with the GUI thread to retrieve chunks of text from the text file as provided by the server process. The line number requested by the user is preferably supplied to the fetcher thread to identify an important section or portion of the text file. A line number identified as important by the user is referred to herein as a "hot line." A chunk of text that contains a hot line is referred to herein as a "hot chunk." Other chunks of text that do not contain any hot line are referred to herein as "normal chunks." Element 208 then starts the parser thread operable in parallel with the GUI thread to parse retrieved chunks of text to identify and index line numbers contained in each chunk. Processing of the user generated event message requesting presentation of the text file is then completed and the thread awaits receipt of another event message is indicating the availability of parsed text in the local cache memory.

In response to receipt of an event message indicating the availability of new parsed text in the local cache memory, element 210 is first operable to get the parsed text object from the local cache memory. Element 212 then inspects the parsed text object to determine if the line number requested by the user (the hot line or lines) has been located in a return chunk of text. If so, element 216 is operable to display the portion of the text file corresponding to the requested line number and surrounding context from the text file to complete the screen display. If the requested line number is determined by element 212 to be not present in the chunks of text parsed in local cache, element 214 is operable to add the requested line number to the a set of hot lines field associated with the parsed test object. As discussed further herein below, the set of hot lines is used by the fetcher and parser threads to assure that the lines the requested by the user are processed as soon as possible in the processing to retrieve the large text file.

Figure 3:
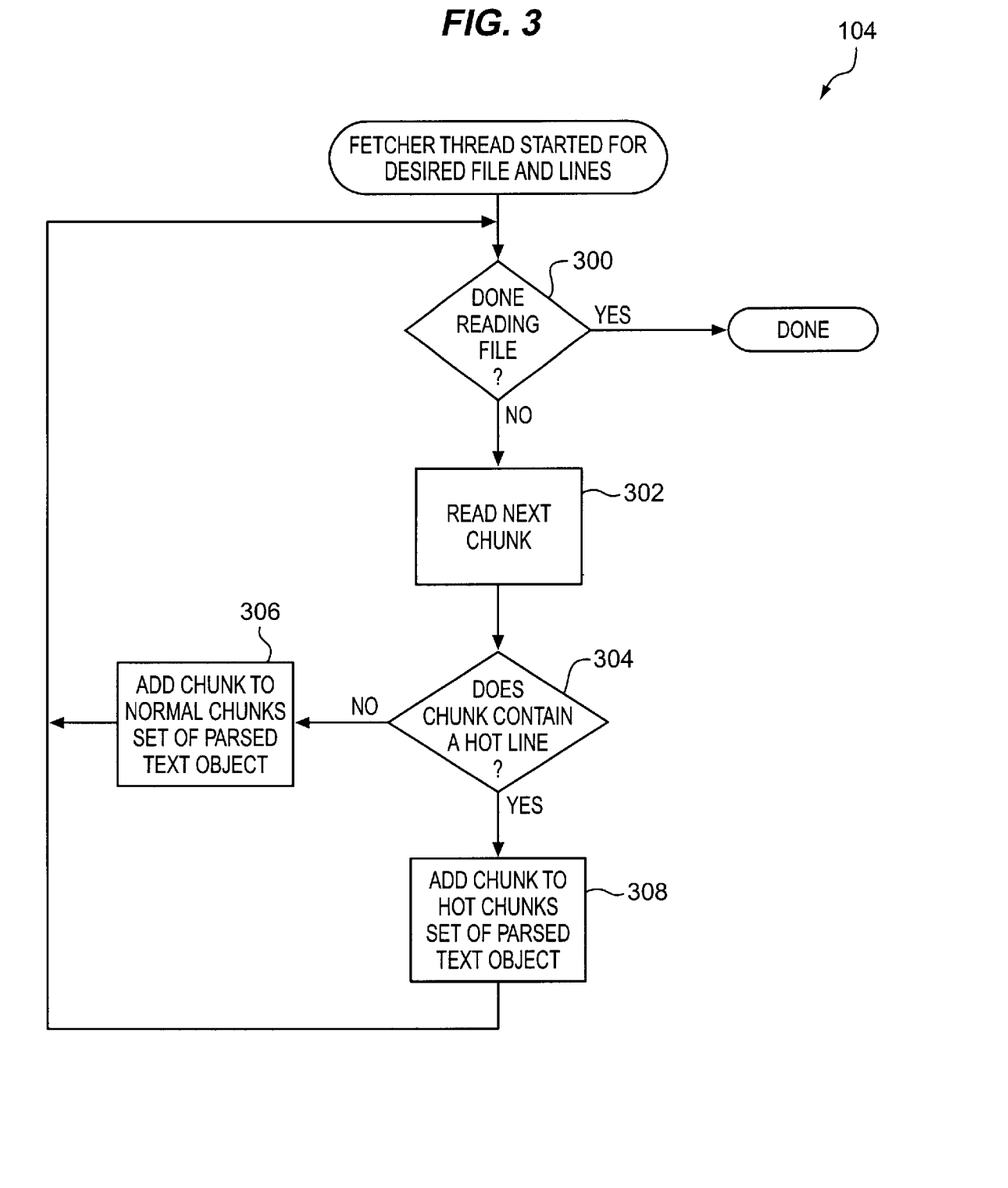
FIG. 3 is a flowchart describing operation of a fetcher thread of the client process of the system of FIG. 1.

FIG. 3 is a flowchart describing operation of the fetcher thread 104 of FIG. 1. As noted above, fetcher thread 104 is operable in parallel with GUI thread 102 and parser thread 106. Fetcher thread 104 is primarily responsible for interacting with the server process or other storage medium to retrieve chunks of the requested text file. As used herein, a "chunk" refers to any convenient block size typically less than the size of the large text file. Typically, a chunk may be equal to a particular predefined block size standard to a particular operating system on which the invention is implemented. Those skilled in the art will readily recognize that a chunk may be any convenient size useful for a particular application of the present invention.

Element 300 is first operable to determine if all chunks of the file have been read by the fetcher process. If so, the fetcher process completes processing and awaits restarting by the GUI thread in response to a new user request for new file. If element 300 determines that additional chunks remain to be read from the server process (or other storage medium), element 302 is next operable to read the next chunk provided by the server process. Typically, element 302 will await receipt of the next chunk sent from the server process to the client process. In an alternative embodiment, element 302 may simply read a chunk of text from a local mass storage medium. Element 304 is then operable to determine whether the chunk just read contains a "hot line" (a line identified as of interest by the user). If not, element 306 is operable to add the chunk to a set of normal chunks field associated with the parsed text object and awaiting parsing by the parser thread. If element 304 determines that the chunk does contain a hot line, element 308 adds the chunk to a set of hot chunks associated with the parsed text object in local cache memory and awaiting processing by the parser thread. In both cases, processing continues by looping back to element 300 to determine if further chunks of the text file remain to be read.

Figure 4:
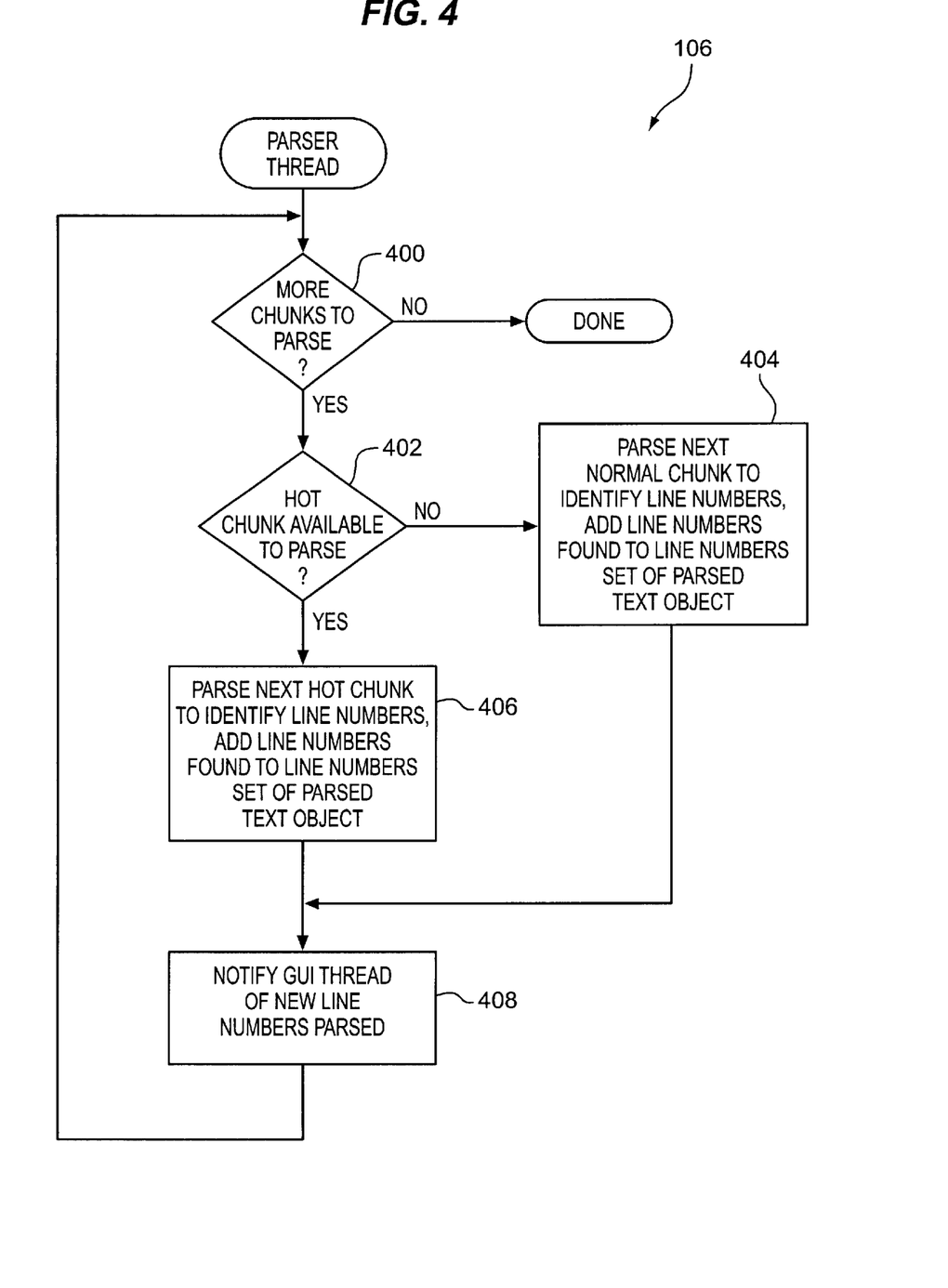
FIG. 4 is a flowchart describing operation of a parser thread of the client process of the system of FIG. 1.

FIG. 4 is a flowchart describing operation of parser thread 106. As noted above, parser thread 106 is operable substantially in parallel with GUI thread 102 and fetcher thread 104. Parser thread 106 is primarily responsible for parsing chunks of text received by fetcher thread 104 to identify line numbers and associated lines of text within the retrieved chunks of text of the text file. A list of line numbers found in the parsing is created as an line number index field associated with the parsed text object in local cache memory.

Element 400 is first operable to determine if more chunks of text from the text file remain to be processed by the parser thread. If not, the parser thread completes and awaits restarting by the GUI thread in response to a new user request for presentation of another text file or another portion of a text file. If element 400 determines that additional chunks of text remain to be processed, element 402 determines if a "hot chunk" is available in cache memory to the parsed. As noted above, hot chunks are those that contains a hot line number (a line number of interest to the user requesting the presentation of the text file). Also as noted above, the parsed text object includes a data structure or field identifying hot chunks as distinguished from normal chunks. If element 402 determines that no hot chunk is available for parsing in local cache memory, element 404 is operable to parse the next available normal chunk to identify line numbers and associated lines of text found in the normal chunks and to add any located line numbers to the line number index field associated with the parsed text object. If element 402 determines that a hot chunk is available for parsing, element 406 then parses the next available hot chunk to similarly identify lines of text and associated line numbers found in the hot chunk and to add the line numbers to be line number index field associated with the parsed text object. In both cases, element 408 is next operable to generate an event message to notify the GUI thread that additional line numbers have been located and indexed in the parsed text object in local cache memory. Processing then continues by looping back to element 400 until all chunks of text fetched by the fetcher thread for the text file have been processed by the parser thread.

As discussed above, the line number index field associated with the parsed text object serve as an index to permit the GUI thread to rapidly locate any selected portion of the large text file for presentation to the requesting user. The GUI thread then utilizes the line number index so generated to permit rapid access to any portion of a text file regardless of the size of the text file.

Figure 5:
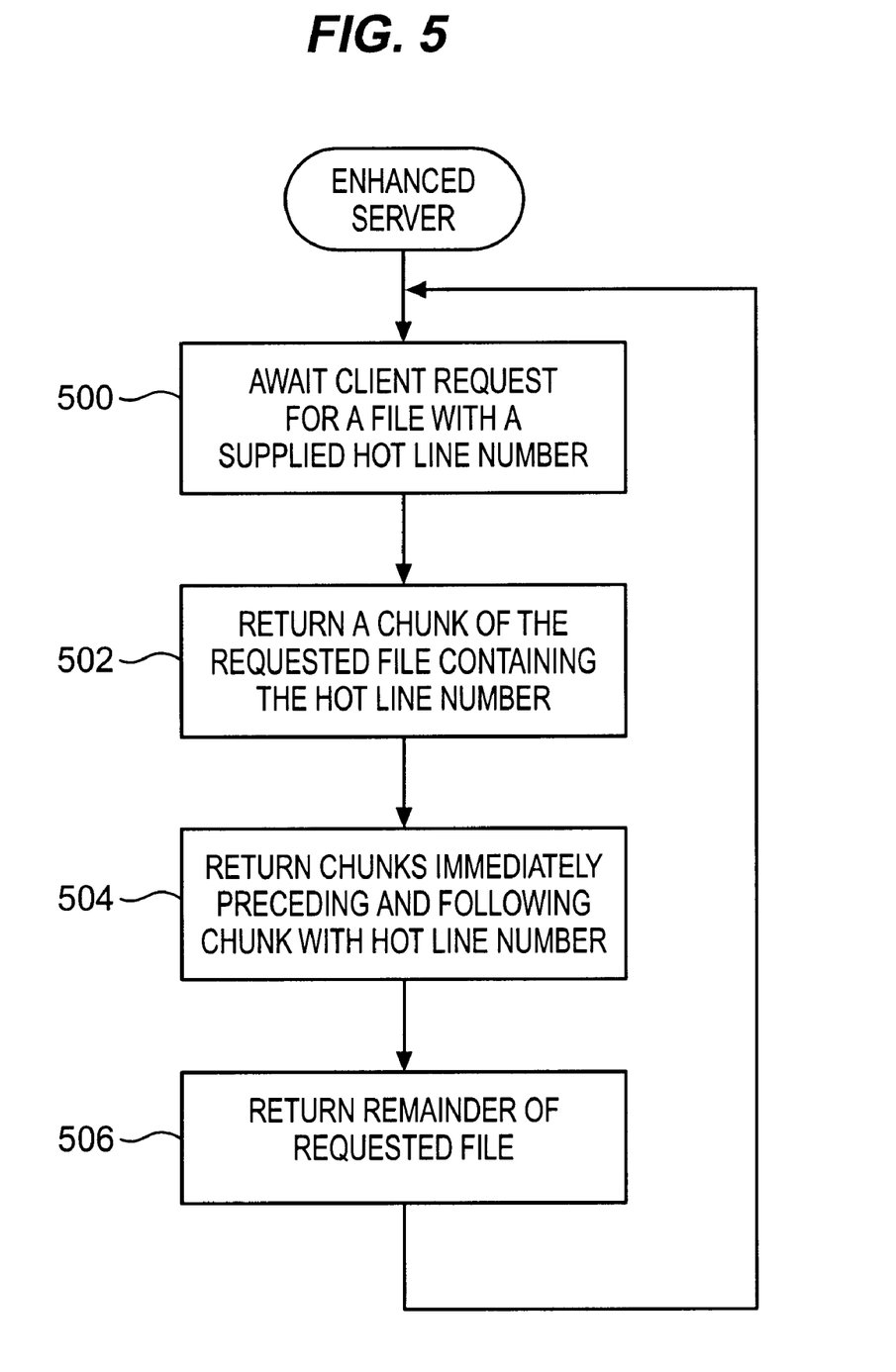
FIG. 5 is a flowchart describing operation of a server process of the system of FIG. 1.

As described thus far, client process 100 of FIG. 1 may operate in conjunction with a standard sequential storage medium whereby chunks of text are retrieved sequentially from the start of the large text file through the end of the file. The client process as described above improves performance of presenting selected portions of a large text file to a requesting user by building and utilizing a line number index in local cache memory. Further performance improvements can be achieved by enhancing the retrieval of chunks of the text file to retrieve chunks in other than sequential order. In particular, the first chunk retrieved for a large text file is preferably that chunk which contains the requested line number identified by the user—the hot line number. In another preferred embodiment, client process 100 interacts with an enhanced server process to retrieve chunks of text from the text file in other than sequential order. In particular, the client process requests the server process to retrieve the file and identifies the selected portion of the file by providing a hot line number used by the server to select the first chunk to be retrieved and returned to the client process. FIG. 5 is a flowchart describing operation of such an enhanced server further improving performance of the system of the present invention for browsing of large text files.

Element 500 is operable to await receipt of a client process request for an identified text file with a supplied hot line number. Element 502 then returns a first chunk of text of the requested text file that contains the supplied hot line number—the hot chunk. Element 504 then preferably returns other chunks near the hot chunk. For example, the preceding and following chunks containing text lines adjacent the line in the hot chunk. Providing these neighboring chunks of text helps assure that portions of text near the hot line will be available for rapid display to the requesting user. Lastly, element 506 returns the remainder of chunks of text of the requested file. By returning chunks of text from the requested file in other than sequential order, the present invention with such an enhanced server process further improves perceived performance by the user for retrieval and presentation of a selected portion of an identified text file. The selected portion (the hot chunk) will be returned by the server to the client before other chunks of text of the text file. As the user browses the selected portion of the file, other chunks of text of the requested file will be received and parsed by parallel operating thread's of the client process.

Those skilled in the art will readily recognize a number of equivalent data structures and methods for implementing the system and methods of the present invention. In particular, those skilled in the art will recognize other functional decompositions of the multi-threaded client process described above. For example, a single threaded program structure may achieve the same function. Further, those skilled in the art will recognize a variety of equivalent data structures and object definitions for implementing the parsed text object and associated fields for representing the text file and line number indices of the present invention. Such design choices are well known to those skilled in the art.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system for displaying large text files comprising:
   a display for presenting text to a user;
   a client process responsive to user requests to display selected portions of a text file on said display; and
   a cache memory associated with said client process for storing data representative of said text file,
   wherein said client process is operable to parse said text file to identify line numbers associated with said text file and wherein said client process is further operable to store indices in said cache memory identifying said line numbers and corresponding portions of said text file and wherein said client process is further operable to display said selected portions of said text file in accordance with said line numbers.

2. The system of claim 1 wherein said client process includes:
   a graphical user interface thread for interacting with a user of said system and for displaying said selected portions of said text file on said display; and
   a parser thread operable substantially in parallel with said graphical user interface thread for parsing said text file to identify said line numbers.

3. The system of claim 2 wherein the system further comprises:
   a server process responsive to requests from said client process to retrieve an identified text file and to return chunks of text from said identified text file to said client process.

4. The system of claim 3 wherein said client process further includes:
   a fetcher thread operable substantially in parallel with said parser thread for receiving said chunks of text from said server process and for storing said chunks of text in said cache memory.

5. The system of claim 3
   wherein requests from said client process to said server process includes at least one line number of interest to a user of the system,
   wherein said server process is operable to return chunks of text that include said at least one line number before other chunks of text that do not include said at least one line number.

6. The system of claim 2 further comprising:
   a parsed text object stored in said cache memory,
   wherein said parser thread is operable to create parsed line objects stored in said cache memory and associated with said parsed text object.

7. The system of claim 6 wherein said parsed text object includes:
   a hot line number set defining at least one line number of interest to a user of the system;
   a normal chunk set defining a first set of chunks of text of said text file that do not contain a line number of interest to a user; and
   a hot chunk set defining a second set of chunks of text of said text file that contain at least one line of text corresponding to said at least one line number in said hot line number set.

8. A method of displaying a text file comprising the steps of:
   receiving a request from a user to display selected portions of said text file;
   retrieving chunks of text from said text file in response to receipt of said request;
   storing the retrieved chunks of text in a cache memory;
   parsing each of the retrieved chunks of text to identify line numbers for lines in said text file;
   constructing a line number index in said cache memory to identify locations in said cache memory of each line of said text file; and
   displaying said selected portions of said text file from said cache memory in accordance with said line number index.

9. The method of claim 8 wherein the step of retrieving comprises the step of:
   requesting said chunks of text from an external server process.

10. The method of claim 9 wherein requests to said external server process includes at least one line number of interest to a user of the system, and wherein the method further comprises the step operable in the server process of:
   returning chunks of text that include said at least one line number before other chunks of text that do not include said at least one line number.

11. The system of claim 8 wherein the step of parsing includes the steps of:
   creating a parsed text object stored in said cache memory and corresponding to said text file; and
   creating parsed line objects stored in said cache memory and associated with said parsed text object and corresponding to said line numbers.

12. The system of claim 11 wherein the step of parsing further includes the steps of:
   creating a hot line number set associated with said parsed text object defining at least one line number of interest to a user of the system;
   creating a normal chunk set associated with said parsed text object defining a first set of chunks of text of said text file that do not contain a line number of interest to a user; and
   creating a hot chunk set associated with said parsed text object defining a second set of chunks of text of said text file that contain at least one line of text corresponding to said at least one line number in said hot line number set.

13. A system for displaying a text file comprising:

a display; and a computing device having a client process including:

means for receiving a request from a user to display selected portions of said text file;

means for retrieving chunks of text from said text file in response to receipt of said request;

means for storing the retrieved chunks of text in a cache memory;

means for parsing each of the retrieved chunks of text to identify line numbers for lines in said text file;

means for constructing a line number index in said cache memory to identify locations in said cache memory of each line of said text file; and means for displaying said selected portions of said text file from said cache memory in accordance with said line number index on said display.

14. The system of claim 13 further comprising:

a server process coupled to said client process, wherein the means for retrieving further comprises:

means for requesting said chunks of text from an external server process.

15. The system of claim 14 wherein requests to said server process includes at least one line number of interest to a user of the system, and wherein the server process further comprises:

means for returning chunks of text that include said at least one line number before other chunks of text that do not include said at least one line number.

16. The system of claim 13 wherein the means for parsing includes:

means for creating a parsed text object stored in said cache memory and corresponding to said text file; and means for creating parsed line objects stored in said cache memory and associated with said parsed text object and corresponding to said line numbers.

17. The system of claim 16 wherein the means for parsing further includes:

means for creating a hot line number set associated with said parsed text object defining at least one line number of interest to a user of the system;

means for creating a normal chunk set associated with said parsed text object defining a first set of chunks of text of said text file that do not contain a line number of interest to a user; and means for creating a hot chunk set associated with said parsed text object defining a second set of chunks of text of said text file that contain at least one line of text corresponding to said at least one line number in said hot line number set.

* * * * *